(12) United States Patent
Early et al.

(10) Patent No.: US 7,389,266 B2
(45) Date of Patent: Jun. 17, 2008

(54) SYSTEMS AND METHODS FOR MANAGING CREDIT ACCOUNT PRODUCTS WITH ADJUSTABLE CREDIT LIMITS

(75) Inventors: Taylor Early, Richmond, VA (US); Rahul Nawab, Richmond, VA (US); Martin Poteralski, Glen Allen, VA (US); Michael Rydzy, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1131 days.

(21) Appl. No.: 09/896,033

(22) Filed: Jun. 29, 2001

(65) Prior Publication Data
US 2003/0004868 A1    Jan. 2, 2003

(51) Int. Cl.
*G06Q 40/00* (2006.01)
(52) U.S. Cl. .............................. 705/39; 705/38; 705/37; 705/36
(58) Field of Classification Search .................. 705/37, 705/38, 36, 26, 39
See application file for complete search history.

(56) References Cited

U.S. PATENT DOCUMENTS 6,219,669 B1 * 4/2001 Haff et al. .................... 707/10
6,980,968 B1 * 12/2005 Walker et al. ................. 705/38
2001/0044756 A1 * 11/2001 Watkins et al. ............... 705/26

OTHER PUBLICATIONS

Common Mistakes Put Prosperity in Peril; [Fifth Edition} Rajpillai, Special to the Plain Dealer the plain Dealer. Cleveland, Ohio: Jun. 28, 2001. p. 28S).*

* cited by examiner

*Primary Examiner*—Frantzt Poinvil
*Assistant Examiner*—Clement Graham
(74) *Attorney, Agent, or Firm*—Finnegan, Henderson, Farabow, Garrett & Dunner, L.L.P.

(57) ABSTRACT

Systems and methods consistent with the present invention manage a credit card having an adjustable credit limit. The system determines whether the credit limit is likely to be reached by possible transactions made by the customer when using the account. The system adjusts the credit limit when it is determined that the credit limit is likely to be reached. The adjusted credit limit is analyzed to determine whether it satisfies predefined credit limit amount criteria associated with the account. The system then revises the adjusted credit limit, as necessary, such that the revised credit limit satisfies the predetermined credit criteria.

62 Claims, 7 Drawing Sheets

SYSTEMS AND METHODS FOR MANAGING CREDIT ACCOUNT PRODUCTS WITH ADJUSTABLE CREDIT LIMITS

BACKGROUND OF THE INVENTION

1. Field of the Invention

Systems and methods consistent with the present invention manage credit accounts, and, more particularly, manage credit accounts having an adjustable credit limit.

2. Description of the Related Art

Credit cards provide a mechanism by which an authorized cardholder may purchase goods or services without an immediate, direct exchange of cash. With each purchase, a cardholder incurs debt, which he or she may thereafter pay in full or pay over a period of time.

The total amount of funds available to the cardholder at any particular time is typically limited to the credit limit (i.e., the maximum allowable debt on a credit card), minus the outstanding balance (i.e., the total debt on a credit card). The credit limit is predetermined by the issuer of the card and is generally based on a number of nonexclusive factors, for example, the cardholder's earning capacity and credit history.

Under most known credit card administration methods, the card issuer informs the cardholder of the credit limit for the credit card. The credit limit acts as a threshold above which the card issuer will not normally allow purchases or cash advances by the cardholder. A cardholder may sometimes circumvent the credit limit by applying for a higher credit limit or by requesting and obtaining express authorization from the card issuer to make a purchase above the credit limit. Both of these options are granted only at the discretion of the card issuer, generally on a case-by-case basis and typically require the manual intervention of the card issuer.

The above technique of administrating a credit card account once the credit limit has been reached is inefficient and too discretionary. It is very time consuming to manually analyze an account to make a determination on whether to increase a credit limit or approve a transaction. Furthermore, because accounts are manually analyzed on a case-by-case basis at the discretion of the cardholder service representative, the potential for inconsistent determinations exist. Still further, in the above technique, the determination on whether to increase a credit limit or approve a transaction can only be made when a cardholder service representative is available. Therefore, during an emergency after business hours, a cardholder may wait hours before he can request a credit limit increase or authorization for a transaction. Based on the above disadvantages, it is desirable to automatically manage the credit limit of an account, thus reducing the time to analyze the account and limiting any inconsistent results.

As stated above, under most known credit card administration methods, the card issuer informs the cardholder of the credit limit for the credit card. Credit cards without a stated limit are typically positioned for premium credit card cardholders, since the cardholder may derive a feeling of prestige in not having a stated credit limit.

SUMMARY OF THE INVENTION

Systems and methods manage credit accounts having an adjustable credit limit. The systems and methods adjust the credit limit based on a determination that the credit limit is likely to be reached by a possible transaction made by the customer. The systems and methods determine, when the credit limit is adjusted higher, whether the adjusted credit limit is above a maximum credit amount that is based on first predetermined credit amount criteria and determine, when the credit limit is adjusted lower, whether the adjusted credit limit is below a minimum credit amount that is based on second predetermined credit amount criteria. The adjusted credit limit is revised based on at least one of the determination of whether the adjusted credit limit is above the maximum credit amount and the determination of whether the adjusted credit limit is below the minimum credit amount.

In a further aspect of the invention, systems and methods manage a credit account having an adjustable credit limit for a customer. The systems and methods determine whether the credit limit is likely to be reached by possible transactions made by the customer when using the account and adjusting the credit limit when it is determined that the credit limit is likely to be reached. The adjusted credit limit is then analyzed to determine whether the adjusted credit limit satisfies predefined credit limit amount criteria associated with the account, and the credit limit is then revised when the adjusted credit limit does not satisfy the predefined credit amount criteria, such that the revised credit limit satisfies the predetermined credit criteria.

Both the foregoing general description and the following detailed description are exemplary and explanatory only and are intended to provide further explanation of the invention as claimed.

BRIEF DESCRIPTION OF THE DRAWINGS

The accompanying drawings provide a further understanding of the invention and, together with the detailed description, serve to explain the principles of the invention. In the drawings.

DESCRIPTION OF THE EMBODIMENTS

Figure 1:
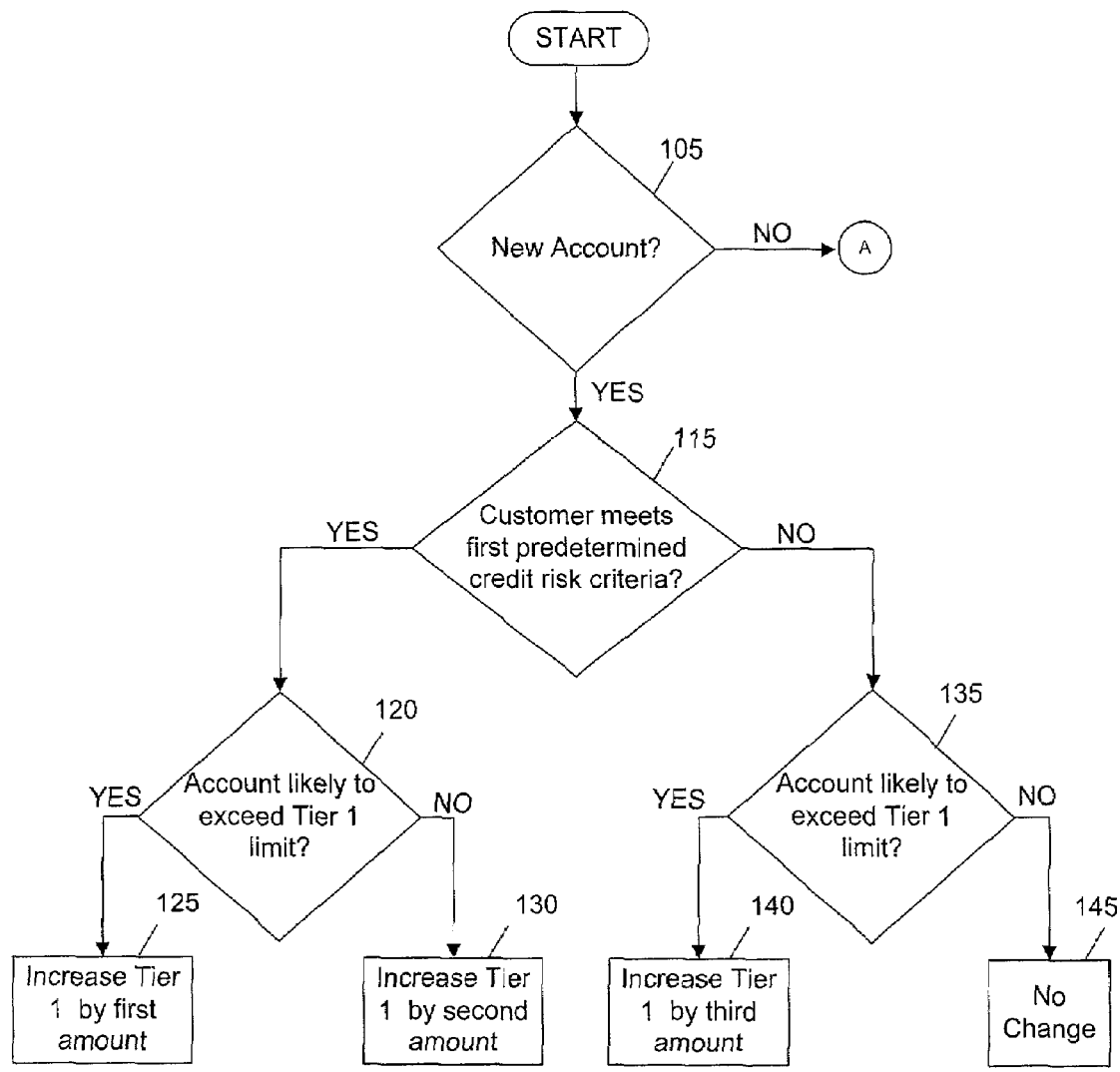
FIGS. 1-2 illustrate a method consistent with the present invention for adjusting a first tier limit.

Systems and methods consistent with the present invention manage a credit card having an adjustable credit limit. While the credit limit may not be known by or otherwise disclosed to the cardholder, as described in the embodiment below, the cardholder may also know of the credit limit of the account. In either case, the card issuer tracks the cardholder's use of the credit card to ensure that the cardholder does not spend beyond his or her ability to pay the outstanding balance, for instance by exceeding the credit limit.

To track the cardholder's use, a Tier 1 and a Tier 2 limit may be established for the cardholder. For example, the Tier 2 limit may correspond to the credit limit of the account, while the Tier 1 limit may correspond to a lower limit signaling when the Tier 2 limit is close to being exceeded. As described below, by adjusting the credit limit based on whether the outstanding balance may exceed the lower Tier 1 limit, the card issuer can more accurately adjust the actual credit limit associated with the Tier 2 limit. The Tier 1 limit may be a predetermined amount below the Tier 2 limit or a predetermined portion of the Tier 2 limit. Thus, systems consistent with the invention may then predict whether the cardholder will exceed the Tier 1 limit and, if so, may make an adjustment to the Tier 1 limit and a corresponding adjustment to the Tier 2 limit. However, while a two tier system is described, the present invention may also make adjustments to a single tier limit that corresponds to the credit limit of the account.

The Tier 1 limit may thus be used for administrative purposes and a cardholder may never know that it has exceeded the Tier 1 limit. If the outstanding balance is below the Tier 2 limit, purchases made by the cardholder that cause the outstanding balance to exceed the Tier 1 limit may be automatically accepted by the card issuer. When the outstanding balance exceeds the Tier 2 limit, transactions may be automatically denied or may be accepted on a case-by-case basis in accordance with, for example, the systems and methods disclosed in U.S. patent application Ser. No. 09/897,775, filed on Jun. 29, 2001, entitled "Systems And Methods For Processing Credit Card Transactions That Exceed A Credit Limit" by Kevin Huennekens, Haicheng Li, Martin Poteralski, Jeffrey Marshall, and Marc Solomon, assigned to the assignee of the present invention and expressly incorporated herein by reference.

Therefore, to avoid potential inconvenience to the cardholder, the card issuer regularly monitors the account to determine whether to increase the Tier 1 and Tier 2 limits, thus making it appear to the cardholder that the credit card has an unlimited balance. So that the cardholder does not exceed the Tier 2 limit, the Tier 1 limit serves as a warning signal to the card issuer that the cardholder is approaching the Tier 2 limit. When it is likely that the cardholder will reach the Tier 1 limit the card issuer determines whether to adjust the Tier 1 and Tier 2 limits.

Figure 4:
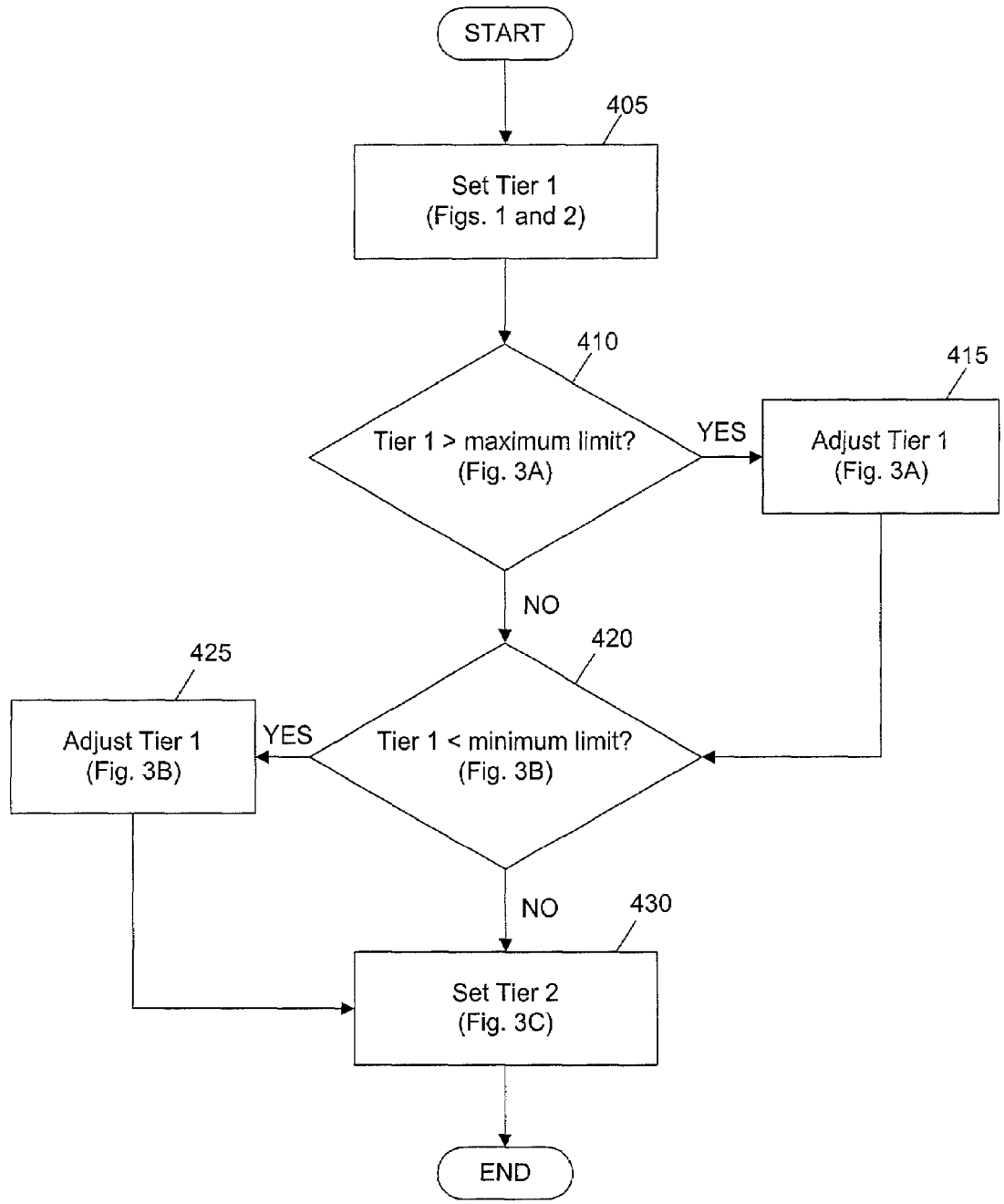
FIG. 4 illustrates a method, consistent with the present invention, for managing a credit account to determine whether to adjust a credit limit.
Figure 5:
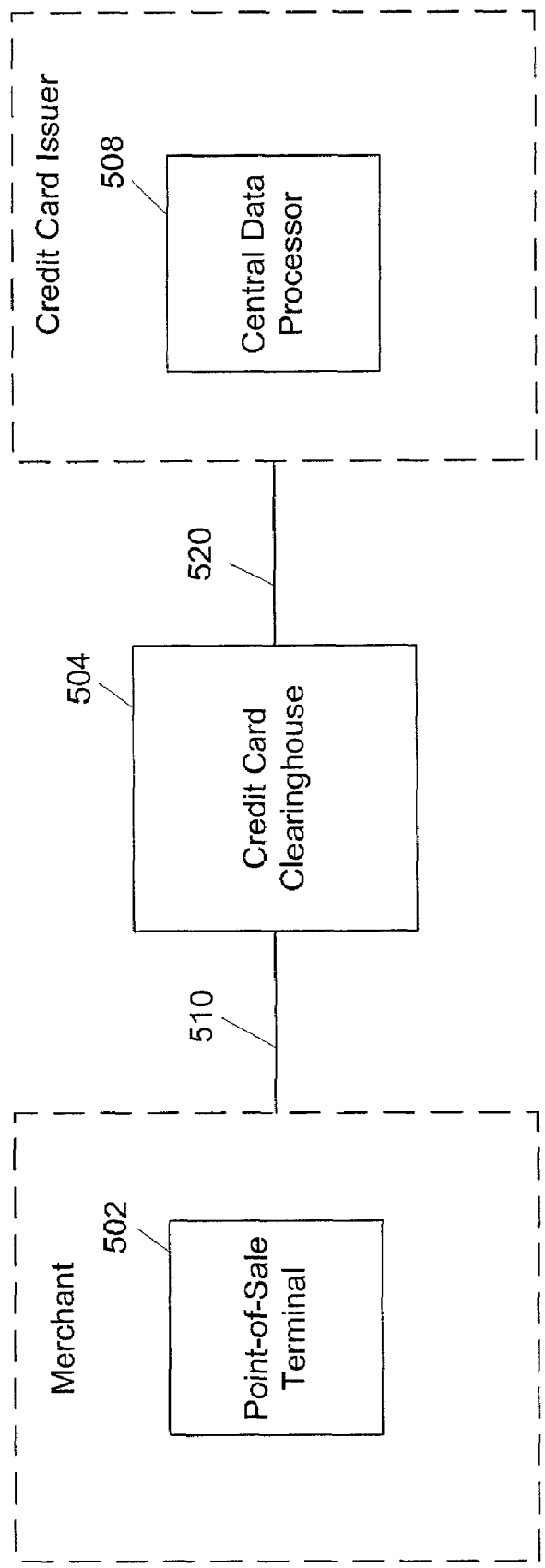
FIG. 5 illustrates an exemplary system environment used to implement the present invention.

FIG. 5 illustrates an exemplary system environment in which to practice the method of the present invention. The system environment may comprise a point-of-sale terminal 502, a credit card clearing house 504, and a central data processor 508. Data processor 508 preferably contains the programming code (not shown) for implementing the features and functions described below with respect to FIGS. 1-4. When a cardholder purchases goods or services with a credit card, a merchant uses the point-of-sale terminal 502 to obtain approval of the credit card transaction from the card issuer. The merchant may obtain approval by first communicating with a credit card clearing house 504 via a connection 510, which then redirects approval requests from the merchant to the credit card issuer via a connection 520. Central data processor 508 then determines whether the credit transaction exceeds a credit limit associated with the account. Moreover, as described below, data processor 508 may then determine whether to adjust the credit limit associated with the account. However, data processor 508 may analyze accounts in accordance with the present invention on a regular basis, e.g., daily or weekly, or transactional basis to determine if the cardholder is approaching or has reached the Tier 1 limit.

FIG. 4 provides an overview of a method in accordance with the present invention of analyzing an account to determine whether to change a Tier 1 and Tier 2 limit. As shown in FIG. 4, at step 405, the processor 508 sets the Tier 1 limit according to a process that will be described in further detail below with reference to FIGS. 1 and 2. Processing then proceeds to step 410 where the processor 508 determines whether the Tier 1 limit exceeds a maximum limit.

If the Tier 1 limit exceeds the maximum limit, i.e., "YES" at step 410, then processor 508 adjusts the Tier 1 limit at step 415 according to a process that will be described in further detail below with reference to FIG. 3A and processing proceeds to step 420. If the Tier 1 limit does not exceed the maximum limit, i.e., "NO" at step 410, then the processor 508 determines at step 420 whether the Tier 1 limit is below a minimum limit.

If the Tier 1 limit is below a minimum limit, i.e., "YES" at step 420, then processor 508 adjusts the Tier 1 limit at step 425 according to a process that will be described in further detail below with reference to FIG. 3B and processing proceeds to step 430. If the Tier 1 limit is not below a minimum limit, i.e., "NO" at step 420, then processing proceeds to step 430. At step 430, processor 508 sets the Tier 2 limit according to a process that will be described in further detail with reference to FIG. 3C.

Systems consistent with the present invention may also perform other types of account management processing known in the art. For instance, the system may determine whether the account is on administrative hold (e.g., because the cardholder is more than 30 days delinquent and has an outstanding balance greater than the annual membership fee). If the account is delinquent or on administrative hold, then the system may determine to keep the Tier 1 and Tier 2 limits unchanged. Other account management processes may also be used with the present invention. While FIG. 4 shows performing in a serial manner the determinations of whether the maximum and minimum values have been satisfied, these determinations may also be performed based on the type of adjustment made to the Tier 1 limit in step 405. For instance, the maximum determination step may be performed only if step 405 adjusts the Tier 1 limit to a higher value. Conversely, the minimum determination step may be performed only if step 405 adjusts the Tier 1 limit to a lower value.

Figure 2:
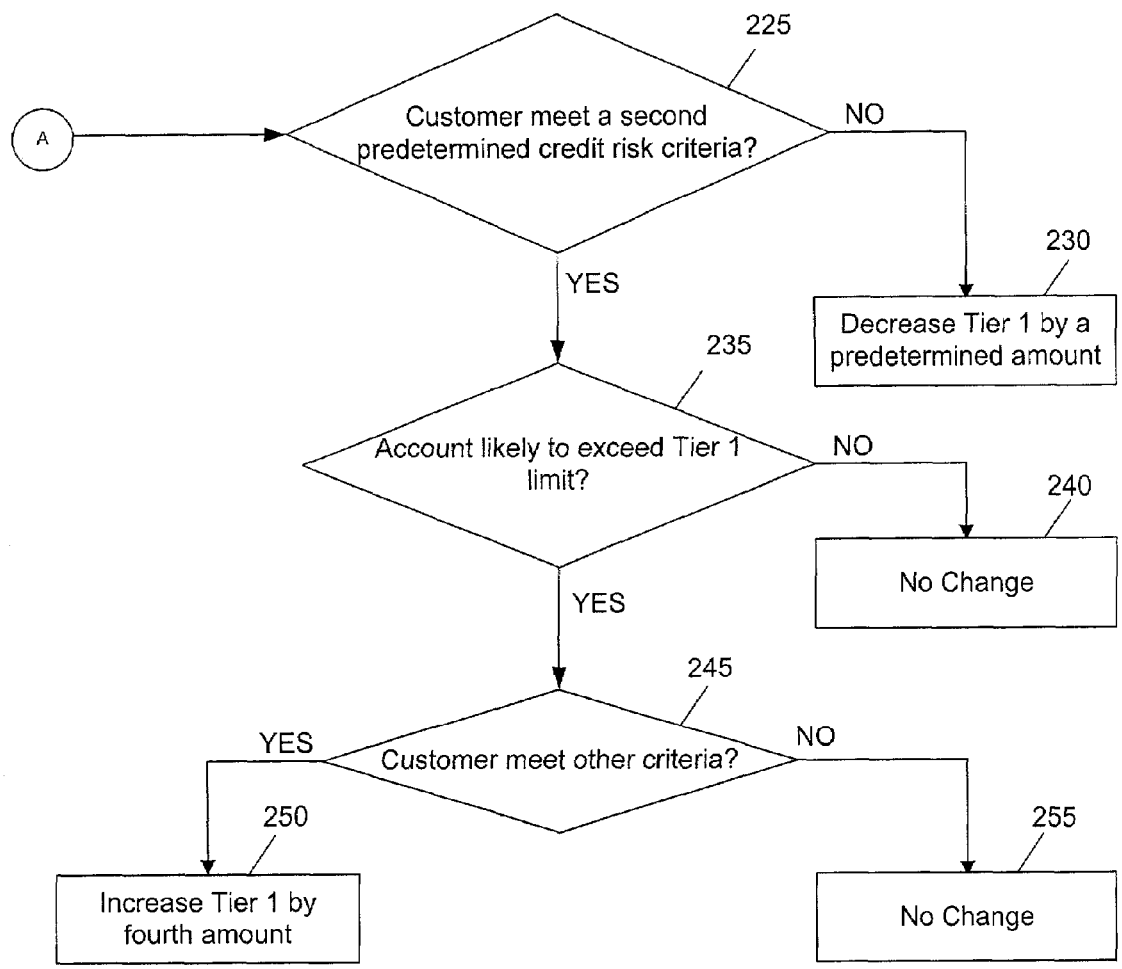

FIGS. 1 and 2 illustrate a Tier 1 adjustment process consistent with the present invention for implementing step 405 of FIG. 4. Turning to FIG. 1, at step 105, the processor 508 determines whether an account is a new account. The processor may determine whether an account is new by determining whether the account has been open for a predetermined amount of time, for example, two (2), four (4), or six (6) months or less. This inquiry is made to monitor new accounts because a decision to change a Tier 1 limit may depend on the maturity of the account. It will be understood by those skilled in the art that a different predetermined amount of time may be used.

If the account is a new account, i.e., "YES" at step 105, then processing proceeds to step 115. If the account is not a new account, i.e., "NO" at step 105, then processing proceeds to step 205 in FIG. 2.

At step 115, the processor 508 determines whether the cardholder meets first predetermined credit risk criteria describing the likelihood that the cardholder will default on the account. As described below, the amount that the Tier 1 limit may be adjusted may be based on whether the cardholder satisfies this credit risk criteria. For instance, lower risk cardholders may receive a higher increase to their Tier 1 and Tier 2 limits. Processor 508 may determine the credit risk associated with a cardholder based on the cardholder's overall credit history, the cardholder's account history (e.g., number of missed or late payments, number of over limit transactions, etc.), as well as the current status of the account (e.g., outstanding balance, minimum next payment due, etc). For example, processor 508 may determine, using techniques well known to those skilled in the art, a likelihood that the customer will default or become delinquent in making payments to the account. Such determinations, as stated above, may be based on the customer's credit history, including the customer's account history. It will be understood by those skilled in the art that different predetermined credit risk criteria may I also be used.

If the cardholder meets the predetermined credit risk criteria, i.e., "YES" at step 115, then the processor 508 determines, at step 120, whether the cardholder is likely to exceed the Tier 1 limit. For example, processor 508 may determine whether a current balance plus a maximum purchase value is greater than then Tier 1 limit. The maximum purchase value may be the largest purchase charged by the cardholder within a predetermined amount of time, e.g., within the last month, two month, or since the account was opened. By adding a maximum purchase value to a current balance to determine whether the cardholder is likely to exceed the Tier 1 limit, the system assumes that the cardholder may make a purchase equal to that value. If the sum of the current balance and the maximum purchase value exceeds the Tier 1 limit, then the system predicts that the cardholder is likely to exceed the Tier 1 limit. It will be understood by those skilled in the art, however, that different criteria may be used to determine whether the cardholder is likely to exceed the Tier 1 limit.

If the determination at step 120 is "YES", then the Tier 1 limit may be increased by a first amount to a new Tier 1 limit at step 125. This increase may be the larger of a fixed amount (e.g., $1,000, $3,000, or $5,000) and the maximum payment received from the cardholder within a predetermined amount of time, e.g., within the last month, two month, or since the account has been opened. Processor 508 increases the current Tier 1 limit since the cardholder is a lower risk cardholder that is likely to exceed his current Tier 1, and thus potentially the current Tier 2 limit.

If the determination at step 120 is "NO", then the current Tier 1 limit is increased by a second amount to a new Tier 1 limit at step 130. The increase by a second amount at step 130 may be smaller than the increase by the first amount at step 125. For example, the current Tier 1 limit may be increased by the larger of a predetermined minimum amount (e.g., $100, $500, or $1,000) and the maximum payment received from the cardholder within a predetermined amount of time, e.g., within the last month, two month, or since the account has been opened. The current Tier 1 limit may be increased by a smaller second amount, rather than a larger first amount, because the card issuer may determine that only a smaller adjustment is necessary as the cardholder is not likely to exceed his current Tier 1 limit.

Returning to step 115, if the cardholder does not meet the predetermined credit risk criteria, i.e., "NO" at step 115, then the processor 508, at step 135, may make the same determination made at step 120. In other words, processor 508 may then determine whether a cardholder is likely to exceed the Tier 1 limit by determining, for example, whether a current balance plus a maximum purchase value is greater than the Tier 1 limit. Since the cardholder has not met the predetermined credit risk criteria, any increases to the Tier 1 limit based on this determination may be lower than any increase associated with step 120.

For instance, if the determination at step 135 is "YES", then the current Tier 1 limit may be increased by a third amount to a new Tier 1 limit at step 140. This third increase may be less than or equal to the second increase at step 130. The card issuer may determine that the third increase should be less than or equal to the second increase because, as stated above, the cardholder is more likely to default on the account as determined at step 115. If the determination at step 135 is "NO", then the Tier 1 limit may remain the same at step 145 or may be slightly increased.

FIG. 2 illustrates the method of analyzing an account that was determined not to be a new account in step 105. At step 225, the processor 508 determines whether the cardholder meets second predetermined credit risk criteria describing the likelihood that the cardholder will default on the account. The second predetermined credit risk criteria is preferably determined in the same way as described above with respect to step 115. However, the second predetermined credit risk criteria may be less strict than the first predetermined credit risk criteria. With an older account, more data is available on the account, thus enabling a more accurate determination to be made of the cardholder's credit risk. It will be understood by those skilled in the art that a different second predetermined credit risk criteria may also be used.

If the cardholder does not meet the second predetermined credit risk criteria, i.e., "NO" at step 225, then the current Tier 1 limit may be decreased to a new Tier 1 limit at step 230. For example, the current Tier 1 limit may be decreased to the minimum of a predetermined minimum amount (e.g., maximum outstanding balance plus $500, $1,000, or $1500), and the current Tier 1 limit. The card issuer may decrease the Tier 1 limit at this step to minimize the card issuer's potential loss because the cardholder has unacceptable credit risk. However, it will be understood by those skilled in the art that the Tier 1 limit may also remain the same at this step.

If the cardholder meets the second predetermined credit risk criteria, i.e., "YES" at step 225, then the processor 508 determines, at step 235, whether the cardholder is likely to exceed the current Tier 1 limit. For example, processor 508 may determine whether a current balance plus a maximum purchase value is greater than the current Tier 1 limit. The processor 508 may determine the maximum purchase value as described above with respect to step 120. It will be understood by those skilled in the art that different criteria may be used to determine whether the cardholder is likely to exceed the Tier 1 limit.

If the determination at step 235 is "NO", then the current Tier 1 limit may remain the same at step 240. If the determination at step 235 is "YES", then the processor 508 may determine, at step 245, whether the cardholder meets other predetermined criteria for increasing the Tier 1 limit. These criteria preferably should be set such that if the cardholder meets the criteria, the card issuer may increase the Tier 1 limit without significantly increasing the card issuer's risk of loss. For example, the criteria may be whether the cardholder's payment history is acceptable. The processor 508 may determine that the cardholder's payment history is acceptable if the cardholder's last payment is at least a predetermined amount above a minimum amount due on his account. The predetermined amount may be 2%, 5%, or 10% of a current balance, for example. It will be understood by those skilled in the art that different criteria may be used at step 245.

If the determination at step 245 is "YES", then the current Tier 1 limit is increased by a fourth amount to a new Tier 1 limit at step 250. This fourth amount may be equivalent to the first, second, or third amount at steps 125, 130, or 140, respectively. If the determination at step 245 is "NO", then the Tier 1 limit may remain the same at step 255. It will be understood by those skilled in the art that the Tier 1 limit may also be increased or decreased at step 255.

Figure 3A:
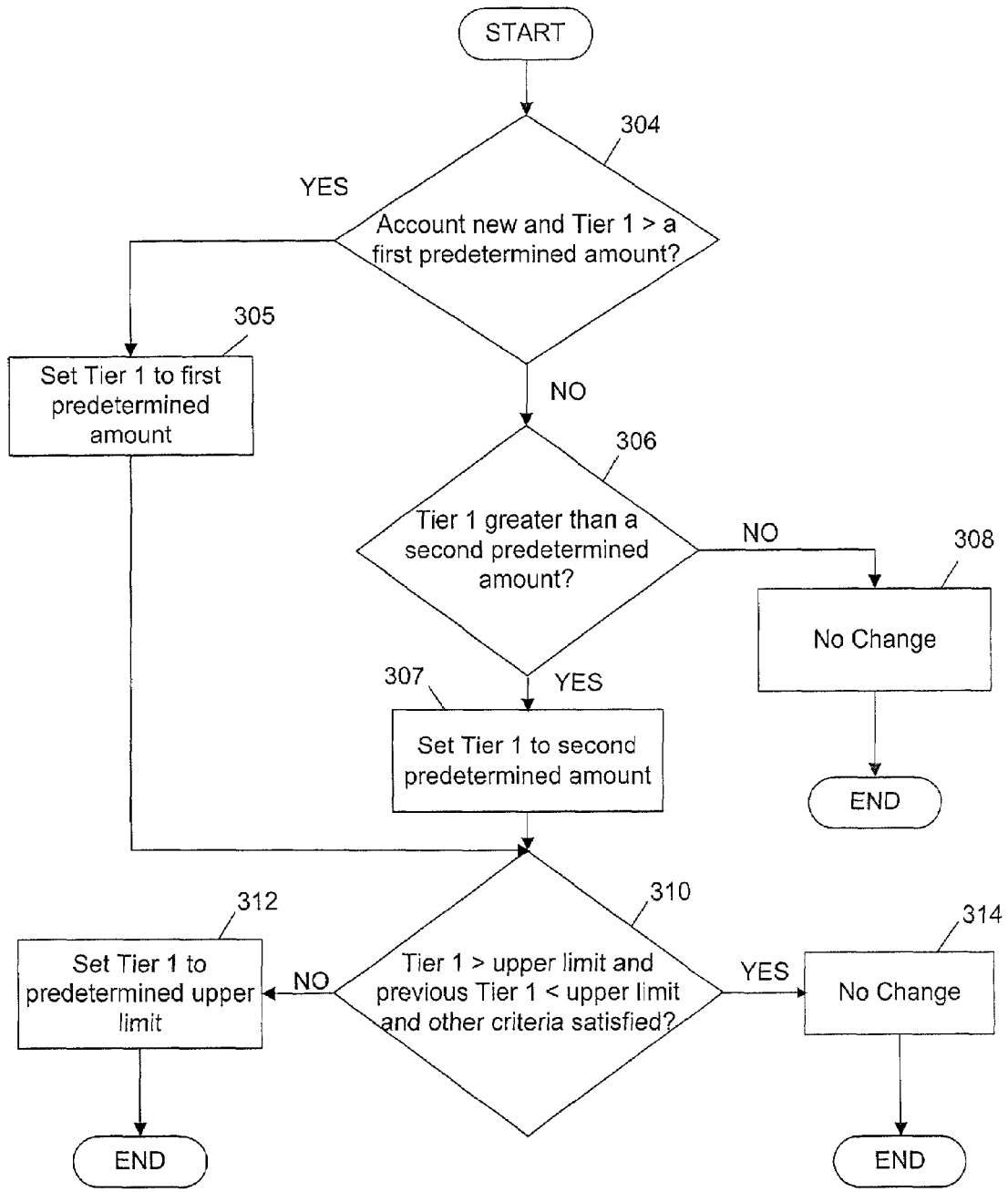
FIG. 3A illustrates a method consistent with the present invention for determining whether a first tier limit is above a maximum limit.
Figure 3B:
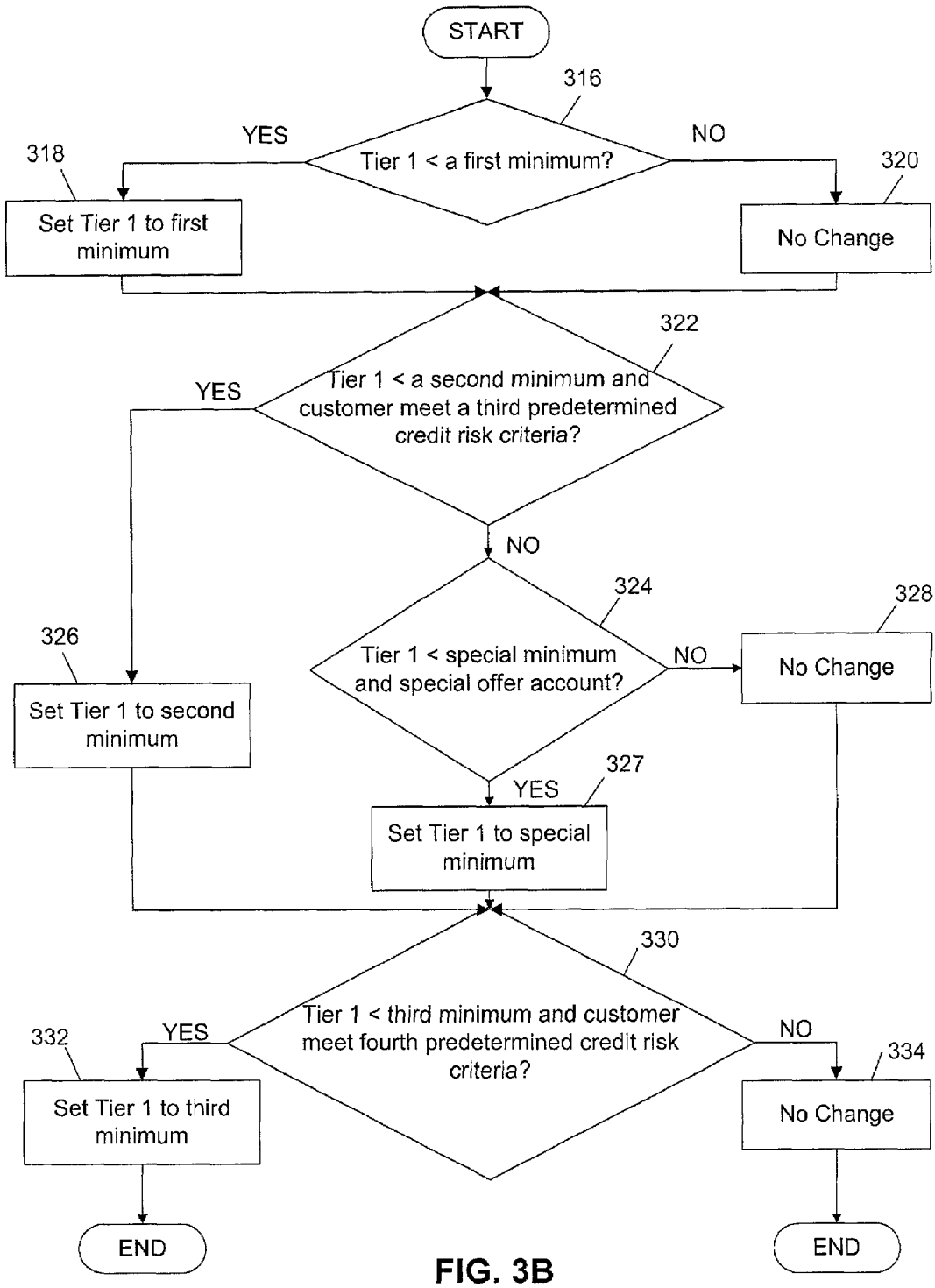
FIG. 3B illustrates a method consistent with the present invention for determining whether a first tier limit is below a minimum limit.
Figure 3C:
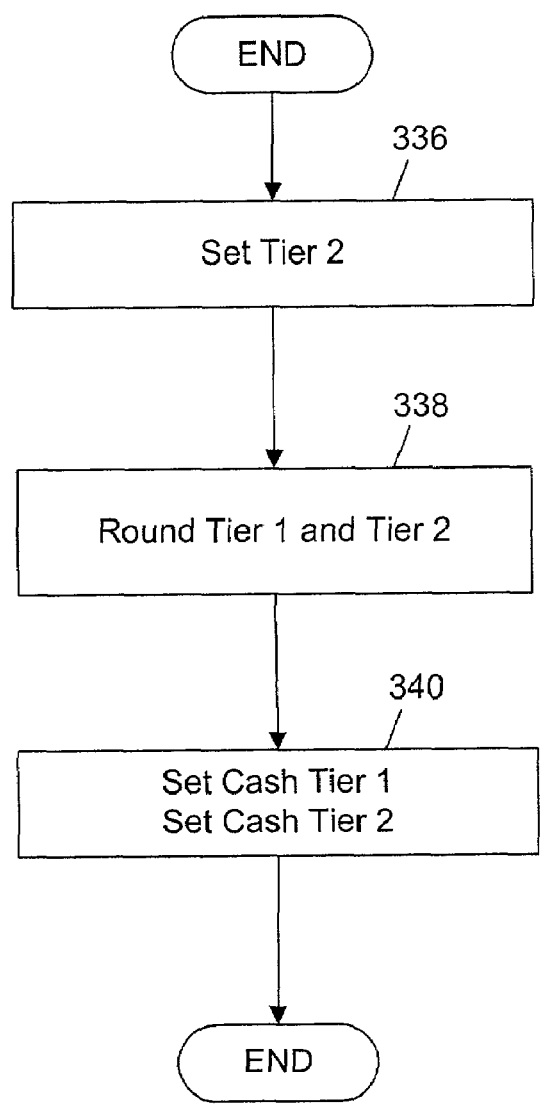
FIG. 3C illustrates a method consistent with the present invention for computing a second tier limit.

After the processor 508 completes the steps illustrated in FIGS. 1 and 2, the additional processing illustrated in FIGS. 3A-C may be performed to determine whether to make additional adjustments to the Tier 1 limit and the Tier 2 limit. More specifically, as discussed above, the processing in FIGS. 3A-3B may be performed to set maximum and minimum values on the Tier 1 limit based on various factors. These factors may include, for example, the cardholder's gross income, how long an account has been open, as well as any other predetermined values or criteria set by the card issuer based on risk models. It will be understood by those skilled in the art that other factors may also be considered in determining the maximum and minimum limit on the cardholder's Tier 1 limit.

FIG. 3A illustrates a method for implementing steps 410 and 415 for determining whether the Tier 1 limit exceeds a maximum value. Turning to FIG. 3A, at step 304, the processor 508 determines whether the account is a newer account by determining, for example, whether the account has been open for a predetermined amount of time (e.g., less than two (2), five (5), or six (6) months), and whether the new Tier 1 limit is greater than a first predetermined amount, for example, a predetermined percentage (e.g., 10%, 15%, or 25%) of the cardholder's gross income. The inquiry at step 304 may be made to reduce the card issuer's risk of the account becoming delinquent by ensuring that new accounts do not exceed a predetermined Tier 1 limit, which may be based on the cardholder's ability to pay. In other words, step 304 ensures that the Tier 1 limit for newer accounts (which are typically more risky than older accounts) does not exceed a certain maximum value. The criteria for determining whether the account is a new account may be different in step 304 from the criteria for determining whether the account is a new account in step 105. It will be understood by those skilled in the art that different criteria for determining whether the account is new and a different first predetermined amount may be used.

If the determination at step 304 is "YES" then the Tier 1 limit may be set equal to the first predetermined amount at step 305. If the determination at step 304 is "NO" then the processor 508 determines, at step 306, whether the Tier 1 limit is greater than a second predetermined amount, for example, a predetermined percentage (e.g., a range between 25% and 50%) of the cardholder's gross income. The purpose of step is to ensure that older accounts also do not exceed a certain maximum limit, which may also be based on the cardholder's ability to pay. The card issuer may determine that the second predetermined amount in step 306 may be larger than the first predetermined amount in step 304 because the risk of an older account becoming delinquent is not increased by allowing for a higher Tier 1 limit at step 306.

If the determination at step 306 is "YES" then the Tier 1 limit may be set equal to the second predetermined amount at step 307. If the determination at step 304 is "NO" then the Tier 1 limit may remain the same at step 308.

From steps 305 and 307, processing proceeds to step 310 where the processor 508 may determine (1) whether the current Tier 1 limit is greater than or equal to a predetermined upper limit, e.g., $25,000 or $50,000, regardless of the cardholder's ability to pay; (2) whether the previous Tier 1 limit was less than the predetermined upper limit; and (3) whether the increase from the previous Tier 1 limit to the current Tier 1 limit occurred because of predetermined circumstances, for example, because the cardholder was likely to exceed his Tier 1 limit. Processor 508 may also determine at step 310 whether the cardholder meets predetermined risk criteria and whether the account is a new account. The determination at step 310 may be to ensure that the Tier 1 limit does not exceed a predetermined upper limit, under most circumstances, regardless of the cardholder's ability to pay. Circumstances under which the Tier 1 limit may exceed the predetermined upper limit may be when the card issuer determines that the cardholder is likely to exceed the Tier 1 limit and the account is a new account.

If the determination at step 310 is "NO" then the Tier 1 limit may be set equal to the predetermined upper limit (e.g., $25,000 or $50,000), at step 312. If the determination at step 310 is "YES" then the Tier 1 limit may remain the same at step 314.

In summary, steps 302 through 314 are provided to set a maximum limit on a cardholder's Tier 1. Factors such as how long an account has been open and the cardholder's ability to pay may determine the maximum Tier 1 limit. However, it will be understood by those skilled in the art that other factors may also be considered in determining the maximum limit on the cardholder's Tier 1 limit.

FIG. 3B illustrates a method for implementing steps 420 and 425 for determining whether the Tier 1 limit is below a minimum value. Turning to FIG. 3B, the processor 508 may determine at step 316 whether the Tier 1 limit is less than a first predetermined minimum, for example $3,000 or $5,000. If the Tier 1 limit is less than the first predetermined minimum, i.e., "YES" at step 316, then the Tier 1 limit may be set to the first predetermined minimum at step 318. If the Tier 1 limit is greater than or equal to the first predetermined minimum, i.e., "NO" at step 316, then the Tier 1 limit may remain the same at step 320.

Processing then proceeds to step 322 where the processor 508 determines whether to further increase the Tier 1 limit if the Tier 1 limit is less than a second predetermined minimum, e.g., $5,000 or $7,500, and if the cardholder meets a third predetermined credit risk criteria. The second predetermined minimum amount reflects the minimum Tier 1 limit the card issuer has determined that the cardholder may have if the cardholder meets the third predetermined credit risk criteria. The third predetermined credit risk criteria may depend on the length of time the account has been opened or other factors, similar to steps 115 and 225 of FIGS. 1 and 2, respectively. Furthermore, the third predetermined credit risk criteria may be the same as the first or second predetermined credit risk criteria or may be different.

If the determination at step 322 is "YES" then the new Tier 1 limit may be set to the second predetermined minimum at step 326. If the determination at step 322 is "NO" then the processor 508 determines, at step 324, whether the new Tier 1 limit is less than a special predetermined minimum and whether the account is a special offer account. A special offer account is an account that the card issuer has guaranteed a minimum Tier 2 limit equal to the special predetermined amount. For example, the special predetermined minimum may be equal to the second predetermined minimum.

If the determination at step 324 is "YES" then the Tier 1 limit is set at step 327 to the guaranteed minimum Tier 1 limit. If the determination at step 324 is "NO" then the Tier 1 limit may remain the same at step 328.

Processing then proceeds to step 330 where the processor 508 determines whether the Tier 1 limit is less than a third predetermined minimum (e.g., a current balance plus a predetermined buffer, such as $500 or $1,000), and whether the cardholder meets fourth predetermined credit risk criteria. The third predetermined minimum may reflect the amount of available credit the card issuer has determined the cardholder should have available before triggering the Tier 1 limit if the cardholder meets the fourth predetermined credit risk criteria. The fourth predetermined credit risk criteria may depend on the length of time the account has been opened in a manner similar to steps 115 and 225 of FIGS. 1 and 2, respectively. Furthermore, the fourth predetermined credit risk criteria may be the same as the first, second, or third predetermined credit risk criteria or may be different.

If the determination at step 330 is "YES", then the Tier 1 limit may be set to the third predetermined minimum at step 332. If the determination at step 330 is "NO" then the Tier 1 limit may remain the same at step 334.

FIG. 3C illustrates a method consistent with the present invention for implementing step 430 for determining a Tier 2 limit. Turning to FIG. 3C, at step 336 the processor 508 determines the Tier 2 limit based on the Tier 1 limit. For example, the Tier 2 limit may be set to a multiple (e.g., 1.5 or 2) of the Tier 1 limit. The Tier 2 limit may also be a fixed amount above the Tier 1 limit. At step 338, the Tier 1 limit and the Tier 2 limit may then be rounded, for example, up to the nearest $1,000 multiple. At step 340, a cash Tier 1 and Tier 2 limit may be set to a percentage of the Tier 2 limit. The cash Tier 1 and Tier 2 limit corresponds to cash advances. For example, the cash Tier 2 limit may be set to 24% or 50% of the Tier 2 limit and the cash Tier 1 limit may be set equal to 10% or 20% of the new Tier 2 limit.

The above processing may be modified such that processor 508 implements the steps illustrated in FIGS. 3A and 3B based on whether the Tier 1 limit is increased or decreased in FIGS. 1 and 2.

Other embodiments of the invention will be apparent to those skilled in the art from consideration of the specification and practice of the invention disclosed herein. For example, the method of the present invention may be implemented using only one tier corresponding to the credit limit. Furthermore, the credit limit may be known to the cardholder. The method of the present invention may be used with any type of credit account. It is intended that the specification and examples be considered as exemplary only, with a true scope and spirit of the invention being indicated by the following claims.

What is claimed is:

1. A system for managing a credit account having an adjustable credit limit for a customer, the system comprising:
   means for setting a first tier limit of the credit account, the first tier limit corresponding to a credit limit of the credit account;
   means for setting a second tier limit of the credit account, the second tier limit corresponding to a credit limit of the credit account greater than the first tier limit;
   means for comparing, periodically, the first tier limit against a sum of the current balance of the credit account and a maximum purchase value charged to the credit account within a predetermined previous period of time;
   means for determining that the sum of the current balance of the credit account and the maximum purchase value is greater than or equal to the first tier limit and outputting a determined result;
   means for adjusting the first tier limit based on a predetermined credit risk criteria and the determined result; and
   means for adjusting the second tier limit based on the adjusted first tier limit.

2. The system of claim 1, wherein means for adjusting the second tier limit further includes:
   means for adjusting the second tier limit to be a predetermined amount above the first tier limit.

3. The system of claim 1, wherein means for adjusting the second tier limit further includes:
   means for adjusting the second tier limit to be above the first tier limit by a predetermined proportion of the first tier limit.

4. The system of claim 1, wherein predetermined credit risk criteria describes a likelihood that the customer will make a delinquent payment to the account.

5. The system of claim 4, wherein the predetermined credit risk criteria is based on how long the account has been open.

6. The system of claim 4, wherein the predetermined credit risk criteria is based on the customer's credit history.

7. The system of claim 4, wherein means for adjusting the first tier limit further includes:
   means for increasing the first tier limit, when the customer meets the predetermined credit risk criteria, by an amount higher than when the customer does not meet the predetermined credit risk criteria.

8. The system of claim 4, wherein means for adjusting the first tier limit further includes:
   means for decreasing the first tier limit when the customer does not meet the predetermined credit risk criteria.

9. The system of claim 4, wherein means for adjusting the first tier limit further includes:
   means for maintaining the first tier limit when the customer does not meet the predetermined credit risk criteria.

10. The system of claim 1, wherein means for adjusting the credit limit further includes:
    means for increasing the first tier limit by an amount based on a payment amount received from the customer.

11. The system of claim 1, further comprising means for determining whether the adjusted first tier limit is above a predetermined proportion of the customer's income.

12. The system of claim 11, wherein the predetermined proportion is based on how long the account has been open.

13. The system of claim 1, wherein the predetermined credit amount criteria is based on the customer's credit history.

14. The system of claim 1, wherein the first predetermined credit amount criteria is a predetermined maximum credit risk associated with the account.

15. The system of claim 1, wherein the predetermined credit amount criteria is a predetermined minimum credit risk associated with the account.

16. The system of claim 15, wherein the predetermined minimum credit risk corresponds to a credit limit previously offered to the customer.

17. The system of claim 1, wherein the comparing is performed after each transaction made by the customer.

18. A system for managing a credit account having an adjustable credit limit for a customer, the system comprising:
    means for setting a first tier limit of the credit account, the first tier limit corresponding to a credit limit of the credit account;
    means for setting a second tier limit of the credit account, the second tier limit corresponding to a credit limit of the credit account greater than the first tier limit;
    means for comparing, periodically, the first tier limit against a sum of the current balance of the credit account and a maximum purchase value charged to the credit account within a predetermined previous period of time;
    means for determining that the sum of the current balance of the credit account and the maximum purchase value is greater than or equal to the first tier limit and outputting a determined result;
    means for adjusting the first tier limit based on a predetermined credit risk criteria and the determined result;
    means for adjusting the second tier limit based on the adjusted first tier limit;
    means for analyzing the adjusted first tier limit to determine that the adjusted first tier limit satisfies predefined credit limit amount criteria associated with the account and outputting an analyzed result reflecting the analysis of the adjusted first tier limit; and means for revising, based on the analyzed result, the adjusted first tier limits to satisfy the predetermined credit limit amount criteria.

19. The system of claim 18, wherein means for adjusting the second tier limit further includes:
means for adjusting the second tier limit to be a predetermined amount above the first tier limit.

20. The system of claim 18, wherein means for adjusting the second tier limit further includes:
means for adjusting the second tier limit to be above the first tier limit by a predetermined proportion of the first tier limit.

21. The system of claim 18, wherein means for adjusting first predetermined credit risk criteria describes a likelihood that the customer will make a delinquent payment to the account.

22. The system of claim 21, wherein the predetermined credit risk criteria is based on how long the account has been open.

23. The system of claim 21, wherein the predetermined credit risk criteria is based on the customer's credit history.

24. The system of claim 21, wherein means for adjusting the first tier limit further includes:
means for increasing the first tier limit, when the customer meets the predetermined credit risk criteria, by an amount higher than when the customer does not meet the predetermined credit risk criteria.

25. The system of claim 21, wherein means for adjusting the first tier limit further includes:
means for decreasing the first tier limit when the customer does not meet the predetermined credit risk criteria.

26. The system of claim 21, wherein means for adjusting the first tier limit further includes:
means for maintaining the first tier limit when the customer does not meet the predetermined credit risk criteria.

27. The system of claim 18, wherein means for adjusting the credit limit further includes:
means for increasing the first tier limit by an amount based on a payment amount received from the customer.

28. The system of claim 18, wherein means for analyzing the adjusted first tier limit further includes:
means for determining whether the adjusted first tier limit is above a predetermined proportion of the customer's income.

29. The system of claim 28, wherein the predetermined proportion is based on how long the account has been open.

30. The system of claim 18, wherein means for analyzing the adjusted first tier limit further includes:
means for determining whether the adjusted first tier limit is within an acceptable range based on the customer's credit history.

31. The system of claim 18, wherein the comparing is performed after each transaction made by the customer.

32. A computer for managing a credit account having an adjustable credit limit for a customer, the computer comprising:
a memory having program instructions; and
a processor, responsive to the programming instructions, configured to perform the method of:
setting a first tier limit of the credit account, the first tier limit corresponding to a credit limit of the credit account;
setting a second tier limit of the credit account, the second tier limit corresponding to a credit limit of the credit account greater than the first tier limit;

comparing, periodically, the first tier limit against a sum of the current balance of the credit account and a maximum purchase value charged to the credit account within a predetermined previous period of time;
determining that the sum of the current balance of the credit account and the maximum purchase value is greater than or equal to the first tier limit and outputting a determined result;
adjusting the first tier limit based on a predetermined credit risk criteria and the determined result; and
adjusting the second tier limit based on the adjusted first tier limit.

33. The computer of claim 32, wherein adjusting the second tier limit further includes:
adjusting the second tier limit to be a predetermined amount above the first tier limit.

34. The computer of claim 32, wherein adjusting the second tier limit further includes:
adjusting the second tier limit to be above the first tier limit by a predetermined proportion of the first tier limit.

35. The computer of claim 32, wherein predetermined credit risk criteria describes a likelihood that the customer will make a delinquent payment to the account.

36. The computer of claim 35, wherein the predetermined credit risk criteria is based on how long the account has been open.

37. The computer of claim 35, wherein the predetermined credit risk criteria is based on the customer's credit history.

38. The computer of claim 35, wherein adjusting the first tier limit further includes:
increasing the first tier limit, when the customer meets the predetermined credit risk criteria, by an amount higher than when the customer does not meet the predetermined credit risk criteria.

39. The computer of claim 35, wherein adjusting the first tier limit further includes:
decreasing the first tier limit when the customer does not meet the predetermined credit risk criteria.

40. The computer of claim 35, wherein adjusting the first tier limit further includes:
maintaining the first tier limit when the customer does not meet the predetermined credit risk criteria.

41. The computer of claim 32, wherein adjusting the credit limit further includes:
increasing the first tier limit by an amount based on a payment amount received from the customer.

42. The computer of claim 32, further comprising determining whether the adjusted first tier limit is above a predetermined proportion of the customer's income.

43. The computer of claim 42, wherein the predetermined proportion is based on how long the account has been open.

44. The computer of claim 32, wherein the predetermined credit risk criteria is based on the customer's credit history.

45. The computer of claim 32, wherein the predetermined credit risk criteria is a predetermined maximum credit amount associated with the account.

46. The computer of claim 32, wherein the second predetermined credit risk criteria is a predetermined minimum credit amount associated with the account.

47. The computer of claim 46, wherein the predetermined minimum credit risk criteria corresponds to a credit limit previously offered to the customer.

48. The computer of claim 32, wherein the comparing is performed after each transaction made by the customer.

49. A computer for managing a credit account having an adjustable credit limit for a customer, the computer comprising:

a memory having program instructions; and a processor, responsive to the programming instructions, configured to perform the method of:

setting a first tier limit of the credit account, the first tier limit corresponding to a credit limit of the credit account;

setting a second tier limit of the credit account, the second tier limit corresponding to a credit limit of the credit account greater than the first tier limit;

comparing, periodically, the first tier limit against a sum of the current balance of the credit account and a maximum purchase value charged to the credit account within a predetermined previous period of time;

determining that the sum of the current balance of the credit account and the maximum purchase value is greater than or equal to the first tier limit and outputting a determined result;

adjusting the first tier limit based on a predetermined credit risk criteria and the determined result;

adjusting the second tier limit based on the adjusted first tier limit;

analyzing the adjusted first tier limit to determine that the adjusted first tier limit satisfies predefined credit limit amount criteria associated with the account and outputting an analyzed result reflecting the analysis of the adjusted first tier limit; and revising, based on the analyzed result, the adjusted first tier limit, to satisfy the predetermined credit limit amount criteria.

50. The computer of claim 49, wherein adjusting the second tier limit further includes:

adjusting the second tier limit to be a predetermined amount above the first tier limit.

51. The computer of claim 49, wherein adjusting the second tier limit further includes:

adjusting the second tier limit to be above the first tier limit by a predetermined proportion of the first tier limit.

52. The computer of claim 49, wherein predetermined credit risk criteria describes a likelihood that the customer will make a delinquent payment to the account.

53. The computer of claim 52, wherein the predetermined credit risk criteria is based on how long the account has been open.

54. The computer of claim 52, wherein the predetermined credit risk criteria is based on the customer's credit history.

55. The computer of claim 52, wherein adjusting the first tier limit further includes:

increasing the first tier limit, when the customer meets the predetermined credit risk criteria, by an amount higher than when the customer does not meet the predetermined credit risk criteria.

56. The computer of claim 52, wherein adjusting the first tier limit further includes:

decreasing the first tier limit when the customer does not meet the predetermined credit risk criteria.

57. The computer of claim 52, wherein adjusting the first tier limit further includes:

maintaining the first tier limit when the customer does not meet the predetermined credit risk criteria.

58. The computer of claim 49, wherein adjusting the first tier limit further includes:

increasing the first tier limit by an amount based on a payment amount received from the customer.

59. The computer of claim 49, wherein analyzing the adjusted first tier limit further includes:

determining whether the adjusted first tier limit is above a predetermined proportion of the customer's income.

60. The computer of claim 59, wherein the predetermined proportion is based on how long the account has been open.

61. The computer of claim 49, wherein analyzing the adjusted first tier limit further includes:

determining whether the adjusted first tier limit is within an acceptable range based on the customer's credit history.

62. The computer of claim 49, wherein the comparing is performed after each transaction made by the customer.

\* \* \* \* \*